(12) United States Patent
Kosuru

(10) Patent No.: US 9,824,105 B2
(45) Date of Patent: Nov. 21, 2017

(54) ADAPTIVE PROBABILISTIC INDEXING WITH SKIP LISTS

(75) Inventor: Ramakumar Kosuru, Austin, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 499 days.

(21) Appl. No.: 13/460,072

(22) Filed: Apr. 30, 2012

(65) Prior Publication Data

US 2013/0290378 A1 Oct. 31, 2013

(51) Int. Cl.
*G06F 17/30* (2006.01)
*G06F 15/16* (2006.01)

(52) U.S. Cl.
CPC ............... *G06F 17/30327* (2013.01)

(58) Field of Classification Search
CPC .................................. G06F 17/30327
USPC ........................................... 707/803
See application file for complete search history.

(56) References Cited

U.S. PATENT DOCUMENTS

| | | | |
|---|---|---|---|
| 5,659,739 A * | 8/1997 | Lubbers et al. | |
| 5,664,179 A | 9/1997 | Tucker | |
| 2003/0112541 A1* | 6/2003 | Lee et al. | 360/55 |
| 2003/0145186 A1* | 7/2003 | Szendy et al. | 711/173 |
| 2005/0198062 A1* | 9/2005 | Shapiro | 707/102 |
| 2009/0164437 A1 | 6/2009 | Torbjornsen | |
| 2010/0043057 A1 | 2/2010 | Di Battista et al. | |
| 2010/0094870 A1 | 4/2010 | Narang et al. | |
| 2012/0136871 A1* | 5/2012 | Soulard et al. | 707/741 |
| 2013/0173627 A1* | 7/2013 | Apte et al. | 707/741 |

FOREIGN PATENT DOCUMENTS

WO   WO-2008009995   1/2008

OTHER PUBLICATIONS

Ergun et al., Biased Skip Lists for Highly Skewed Access Patterns, 2001.*
Bose et al., Dynamic optimality for skip lists and B-trees, Proc. of the Nineteenth Annual ACM-SIAM Symposium on Discrete Algorithms (2008).*
Pittard et al., Simplified Self-Adapting Skip Lists, 2010.*
Bagchi et al., Biased Skip Lists, Mar. 30, 2004.*
Martinez et al., Optimal and Nearly Optimal Static Weighted Skip Lists, Technical report LSI-95-34-R. Dept. Llenguatges i Sistemes Informatics Universitat Politchnica de Catalunya (1995).*
Min, J.K., "A Query Index for Stream Data Using Interval Skip Lists Exploiting Locality," Proc. of the 7th Intl. Conf. on Computational Science, vol. 4487, pp. 245-252 (2007).

* cited by examiner

*Primary Examiner* — Brittany N Allen
(74) *Attorney, Agent, or Firm* — Dicke, Billig & Czaja, PLLC

(57) ABSTRACT

A method of indexing in a skip list is disclosed. Key/value pairs are randomly inserted at an appropriate page in a skip list. A new page is created at the lowest level in the skip list. When creating the new page, the page is incremented to a higher level with a write probability. Reading the new page during a search. When reading the new page, the page is incremented to a higher level with a read probability. The read probability is not equal to the write probability.

20 Claims, 5 Drawing Sheets

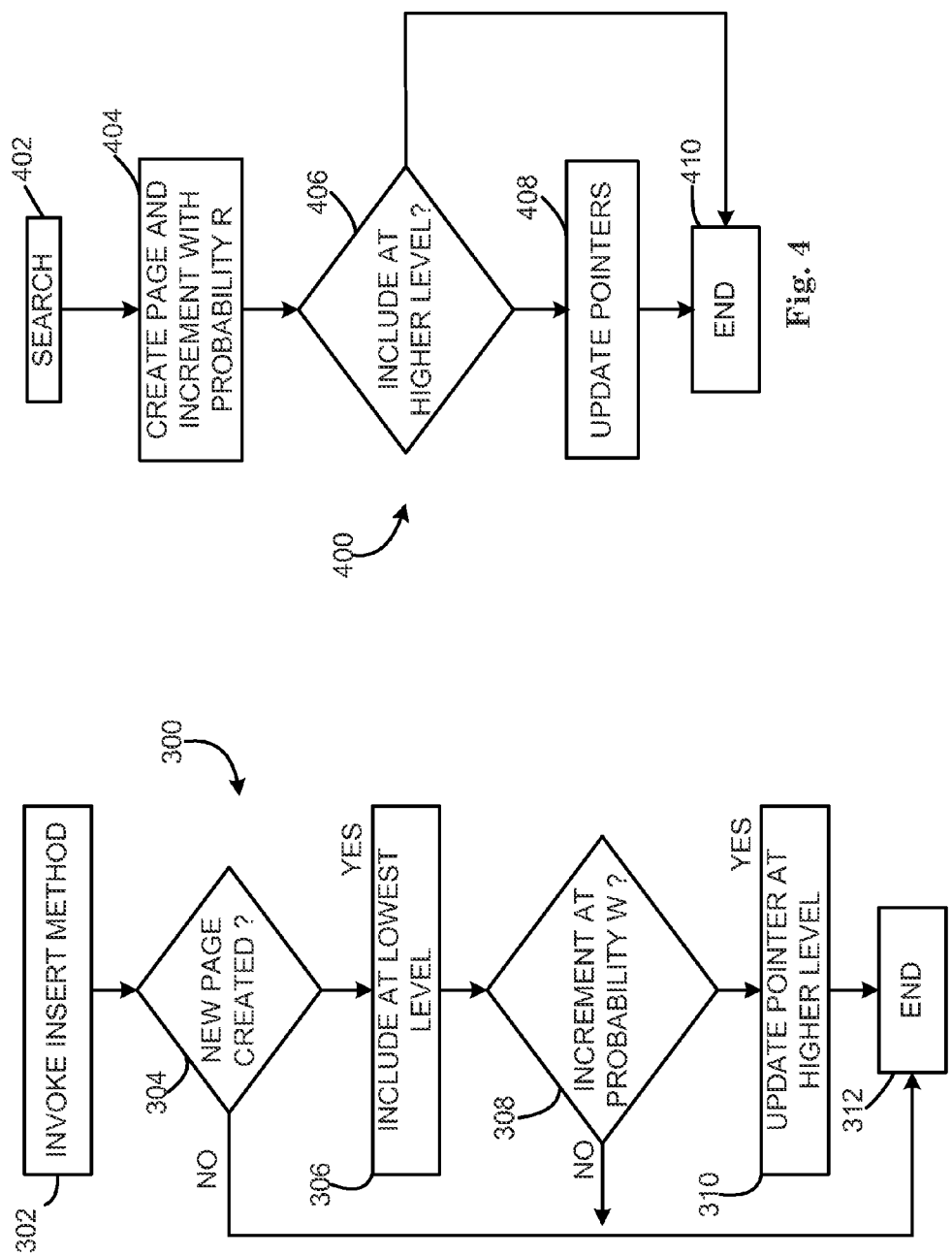

ADAPTIVE PROBABILISTIC INDEXING WITH SKIP LISTS

BACKGROUND

Data systems build index structures to provide efficient accessing of data pages in a data file. Examples of popular index structures include a B-tree form of tree data structure and a skip list. The B-tree is a generalization of a binary search tree in that a node can have more than two children. Unlike self-balancing binary search trees, the B-tree is advantageous in systems that read and write large blocks of data. It is commonly used in databases and filesystems.

B-trees have substantial advantages over alternative implementations when node access times far exceed access times within nodes. In such cases, the cost of accessing the node may be amortized over multiple operations within the node. This usually occurs when the nodes are in secondary data storage such as disk drives. Increasing the number of child nodes within each internal node decreases the height of the tree, and the number of expensive node accesses is reduced. In addition, rebalancing the tree occurs less often.

In situations where a query workload is unpredictable or if just a selected portion is accessed, such as "hot data," however, using a B-tree for all of the data can be inefficient especially when there are a large number of random reads and writes. Examples of this can be seen in newer disk technologies such as a solid-state disk (SSD) where update mechanisms are often more complex and more expensive than other disk technologies. Attempts to improve the performance of B-trees in newer disk technologies have included partitioned B-trees and database cracking for building index structures that are adaptive. These approaches, however, postpone the cost of index construction to subsequent queries in the system.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. The elements of the drawings are not necessarily to scale relative to each other. Like reference numerals designate corresponding similar parts.

FIG. 3 is a flow diagram illustrating a process for random inserts into the skip list of FIG. 2.

FIG. 4 is a flow diagram illustrating a process for reads of the random inserts into the skip list of FIG. 2.

DETAILED DESCRIPTION

In the following Detailed Description, reference is made to the accompanying drawings, which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims. It is to be understood that features of the various embodiments described herein may be combined with each other, unless specifically noted otherwise.

The methods or processes described below can be included on one or more computer readable storage mediums storing computer executable instructions for controlling a processor, computing device, or distributed computing system to perform the method. Some example processes are described in terms of computer code or pseudo code, which can readily become computer executable instructions. Examples of computer readable storage mediums can include computer memory, storage devices, or other articles capable of tangibly storing computer executable instructions.

Figure 1:
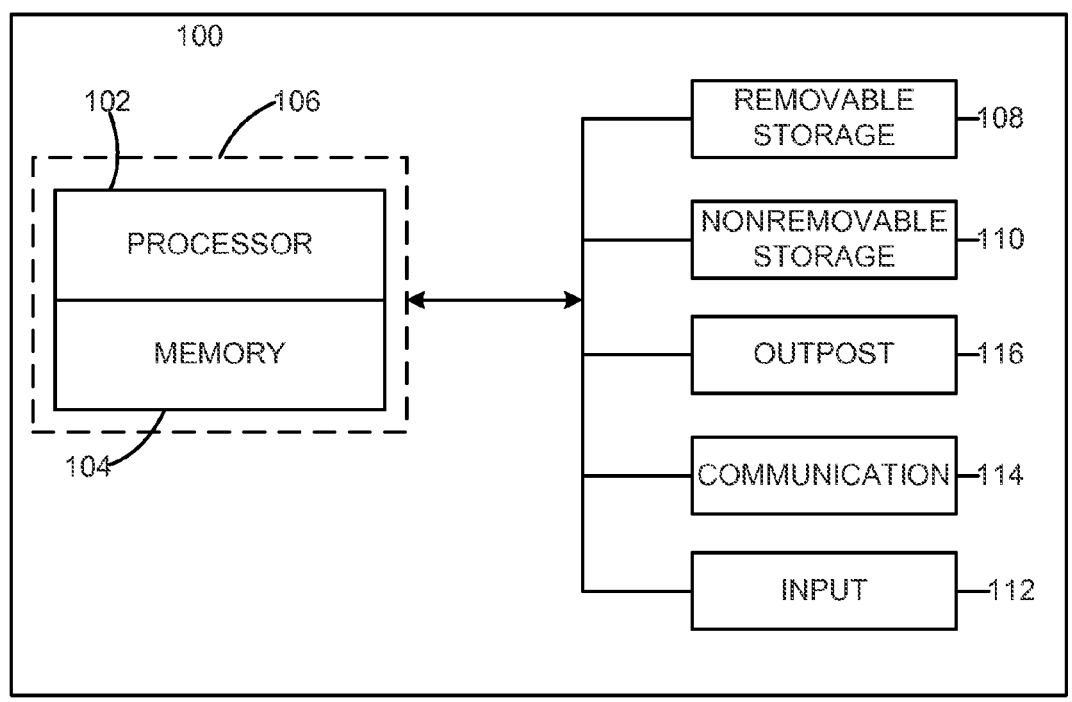
FIG. 1 is a block diagram illustrating an exemplary computing device.

FIG. 1 illustrates an exemplary computer system that can be employed in an operating environment such as alone, as a distributed computing system, or other form of computer network and used to host or run an application included on one or more computer readable storage mediums storing computer executable instructions for controlling a computing device or distributed computing system to perform a method.

The exemplary computer system includes a computing device, such as computing device 100. In a basic configuration, computing device 100 typically includes a processor system having one or more processing units, i.e., processors 102, and memory 104. Depending on the configuration and type of computing device, memory 104 may be volatile (such as random access memory (RAM)), non-volatile (such as read only memory (ROM), flash memory, etc.), or some combination of the two. This basic configuration is illustrated in FIG. 1 by dashed line 106. The computing device can take one or more of several forms. Such forms include a person computer, a server, a handheld device, a consumer electronic device (such as a video game console), or other.

Computing device 100 can also have additional features or functionality. For example, computing device 100 may also include additional storage (removable and/or non-removable) including, but not limited to, magnetic or optical disks or solid-state memory, or flash storage devices such as removable storage 108 and non-removable storage 110. Computer storage media includes volatile and nonvolatile, removable and non-removable media implemented in any suitable method or technology for storage of information such as computer readable instructions, data structures, program modules or other data. Memory 104, removable storage 108 and non-removable storage 110 are all examples of computer storage media. Computer storage media includes, but is not limited to, RAM, ROM, EEPROM, flash memory such as solid-state drives (SSD) or other memory technology, CD-ROM, digital versatile discs (DVD) or other optical storage, magnetic cassettes, magnetic tape, magnetic disk storage or other magnetic storage devices, universal serial bus (USB) flash drive, flash memory card, or other flash storage devices, or any other medium that can be used to store the desired information and that can be accessed by computing device 100. Any such computer storage media may be part of computing device 100.

Computing device 100 includes one or more communication connections 114 that allow computing device 100 to communicate with other computers/applications. An example communication connection can be an Ethernet interface. In some examples, the computing device can also have one or more additional processors or specialized processors (not shown) to perform processing functions offloaded from the processor 102. Computing device 100 may also include input device(s) 112, such as keyboard, pointing device (e.g., mouse), pen, voice input device, touch input device, etc. Computing device 100 may also include output device(s) 111, such as a display, speakers, printer, or the like.

The computing device 100 can be coupled to a computer network, which can be classified according to a wide variety of characteristics such as topology, connection method, and scale. A network is a collection of computing devices and possibly other devices interconnected by communications channels that facilitate communications and allows sharing of resources and information among interconnected devices. Examples of computer networks include a local area network, a wide area network, the Internet, a Storage Area Network, or other network.

The operating system, or other program, typically includes memory management techniques to make efficient use of the memory hierarchy. An example memory management technique includes virtual memory. This technique virtualizes the various types of storage in the memory hierarchy, and allows a computer application to be designed to access data as if there was only one type of storage in the computer architecture, i.e., virtual memory. The virtual memory behaves as if it was directly accessible main memory.

Paging is often included as part of virtual memory implementation in many operating systems. A memory page, or page, is a fixed-length contiguous block of virtual memory that is a unit of data for memory allocation performed by the operating system and is a unit of data for transfer between main memory and any other auxiliary storage, such as a removable and non-removable storage 108, 110. In one example, a page is the smallest unit of memory allocation and data transfer. Page size for a given computing device 100 is typically determined by the processor architecture. (Other example units of memory allocation are contemplated, but for clarity the examples below are discussed in terms of pages. The examples below can also be modified to include other units or forms of memory allocation.) Through the use of paging, the physical address space of a process to be noncontiguous.

Figure 2:
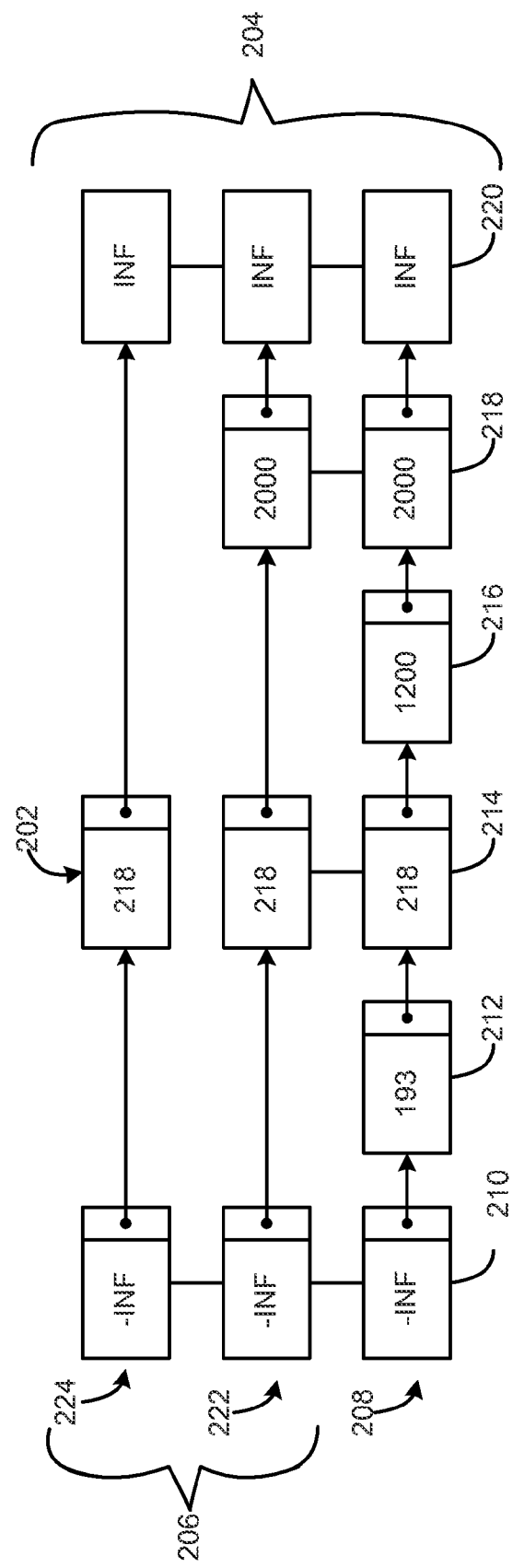
FIG. 2 is a block diagram illustrating a skip list data index structure for use in the computing device of FIG. 1 to access and store data.

FIG. 2 illustrates a skip list index structure 200 for accessing data pages constructed in accordance with the present disclosure. A skip list is a data structure for storing a sorted list of items 202 using a hierarchy of linked lists in a plurality of levels 204 that connect increasingly sparse subsequences of the items. Each link of the sparser lists 206 skips over many items of the full list 208 in one step. These forward links may be added in a randomized way with a geometric or negative binomial distribution. Skip lists can provide for random access, where data can be inserted (written) or read from anywhere in the data structure as opposed to sequentially such as starting at the beginning of the data structure. Skip lists use probabilistic balancing rather than strictly enforced balancing, and, as a result, the algorithms for insertion and deletion of pages in skip lists can more efficient in certain storage devices than corresponding algorithms in B-trees. Skip lists have similar search and update characteristics as that of B-trees and are well suited for read/write concurrent accesses by multiple requests such as in shared memory parallel processing.

Items 202, or nodes, in skip list 200 can represent a page of memory with a corresponding fence key. In this example, inserts, deletes, and scans are key based and random. Key values that are more than the previous node's fence key and less than the current node's fence key are stored in the current page. The list 208 of the lowest level, often called level 0, contains all of the items in the data structure stored in a sorted order such as by increasing fence key. Each item 202 points to the next item in the order. In list 208, items begin from negative infinity 210, which points to item 212. Item 212 points to item 214, which points to item 216. Item 216 points to item 218, which points to infinity 220. All levels 204 begin with negative infinity 210 and are terminated with infinity 220. The next level 222 of the example includes negative infinity 210 pointing to item 214, which points to item 218. The final level 224 in the level 2 skip list includes negative infinity pointing to item 214, which points to infinity 220. An item of level i has i+1 forward pointers.

An example of searching for an item 202 with a particular key begins with negative infinity 210 in the highest level. The search proceeds horizontally until, in one example, the current item is greater than or equal to the target. If the current element is equal to the target item, it has been found. If the current element is greater than the target, or the search reaches the end of the linked list, the procedure is repeated after returning to the previous element and dropping down vertically to the list in the next highest level.

The number of levels 204 for each item 202 is determined randomly with the exception that items negative infinity 210 and infinity 220 are included in each level having items. A skip list can be configured to have no more than a selected amount of level, or the MaxLevel. Skip lists are often configured so that for each item in a given level has a probability p of extending into the next highest level. Probabilities of 0.2 to 0.5 can be used for p, are used to populate a skip list on a storage medium. An example incrementing process for determining which items 202 are included in higher levels includes:

```
level := 0
// random( ) is a random number generator that returns a value in [0...1)
while random( ) < p and level < MaxLevel do
    level := level + 1
return level
```

For random inserts where data can be written anywhere in the skip list, however, a different process can be used. For example, incoming insert requests are sorted for a fixed window size, for example 10 k bytes to 20 k bytes to improve elapsed times. Also, new items 202 are inserted into list 208 at the lowest level, or a probability p=0 for new items. This limits the number of pages to be modified at insert to two, i.e., the previous page (the page that will point to the inserted page) and the inserted page in the list 208. Read requests for the newly inserted page can be incremented with a probability p as used in the incrementing process for populating the storage medium. Accordingly, there are two probabilities for new pages: a probability for writes, or w, and a probability for reads, or r. In one example, the probability of w is not equal to the probability of r, FIG. 3 illustrates a process 300 of randomly inserting keys into the skip list 200. Method I.insert(k, v) is invoked when a key k is to be inserted into the skip list 200, where v is the value for the key k at 302. Method I.insert(k, v) inserts the key/value pair (k, v) at the appropriate, or corresponding, page in the skip list. If this causes a new page to be created, at 304, the new page is created at the lowest level, at 306. The previous page and the new page are locked and updated. If the r=0, no, pointers at levels greater than the lowest level 208 are updated. If the page is to be incremented in a higher level using a probability of r>0, at 308 the forward pointers of the previous page and the new page in the higher level(s) are updated, at 310. The process 300 ends, at 312.

FIG. 4 illustrates a process 400 for reads of the random inserts into the skip list 200. The page to be read is found using a skip list search process, at 402. A read of the random page will invoke the incrementing process above applying the probability r, at 404. If the item is to be included in a higher level, at 406, the forward pointers of the previous page and the new page in the higher level(s) are updated, at 408. No pointers at the lowest level are adjusted. The process 400 ends, at 410.

Figure 5:
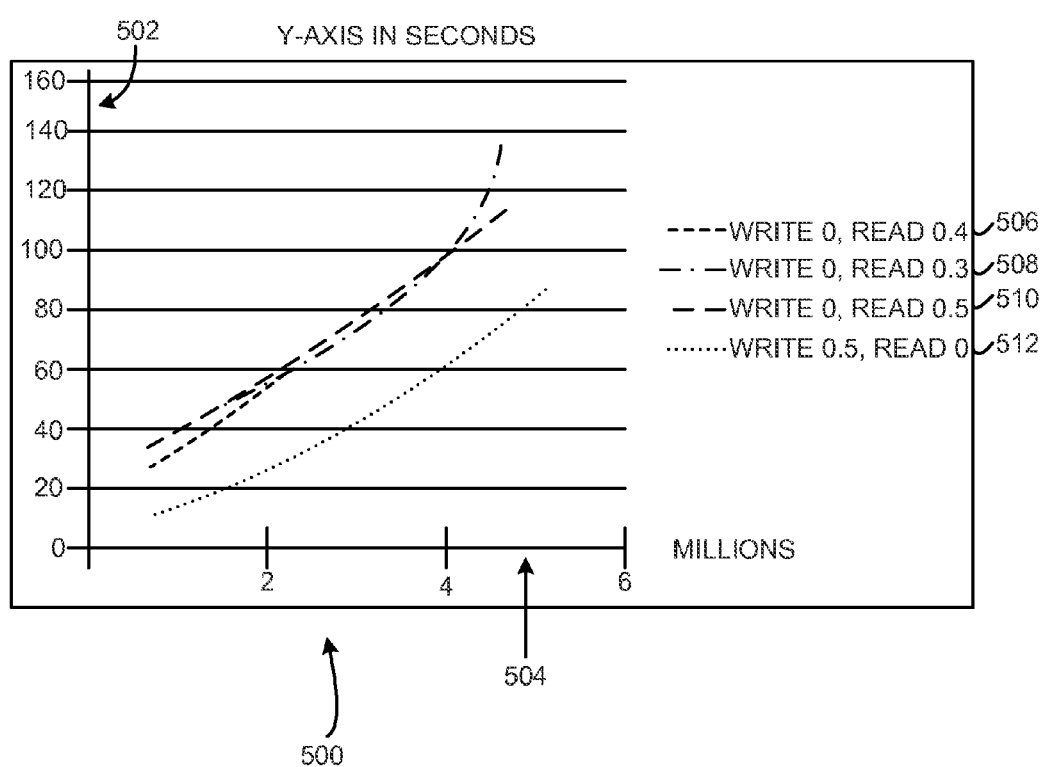
FIG. 5 is a graph illustrating results of a first example using the skip list of FIG. 2

FIG. 5 is a graph 500 illustrating results of a first experiment of the adaptive probabilistic indexing on a hard disk drive where time in seconds is along the y-axis 502 against millions of I/O requests along the x-axis 504. In the first experiment, 5 million I/O requests are sent to the skip list where 1 million requests are random inserts (writes) and 4 million are random reads. Also, 500 cache pages and a window size of 20 k Bytes to sort requests on key before the submission to the skip list.

Various probabilities were used. In the first test 506, the read probability was 0.4 and the write probability was 0. In the second test 508, the read probability was 0.5 and the write probability was 0. In the third test 510, the read probability was 0.3 and the write probability was 0. In the fourth test 512, the read probability was 0 and the write probability was 0.5. The read probability of 0 and the write probability of 0.5 outperformed the others indicating that penalty is being paid for postponing maintenance to the reads. This indicates read and write probabilities can be set or determined according to the distribution or ratio of expected reads to writes. If a penalty is being paid for postponing maintenance during reads or writes, the corresponding probabilities can be adjusted accordingly.

Figure 6:
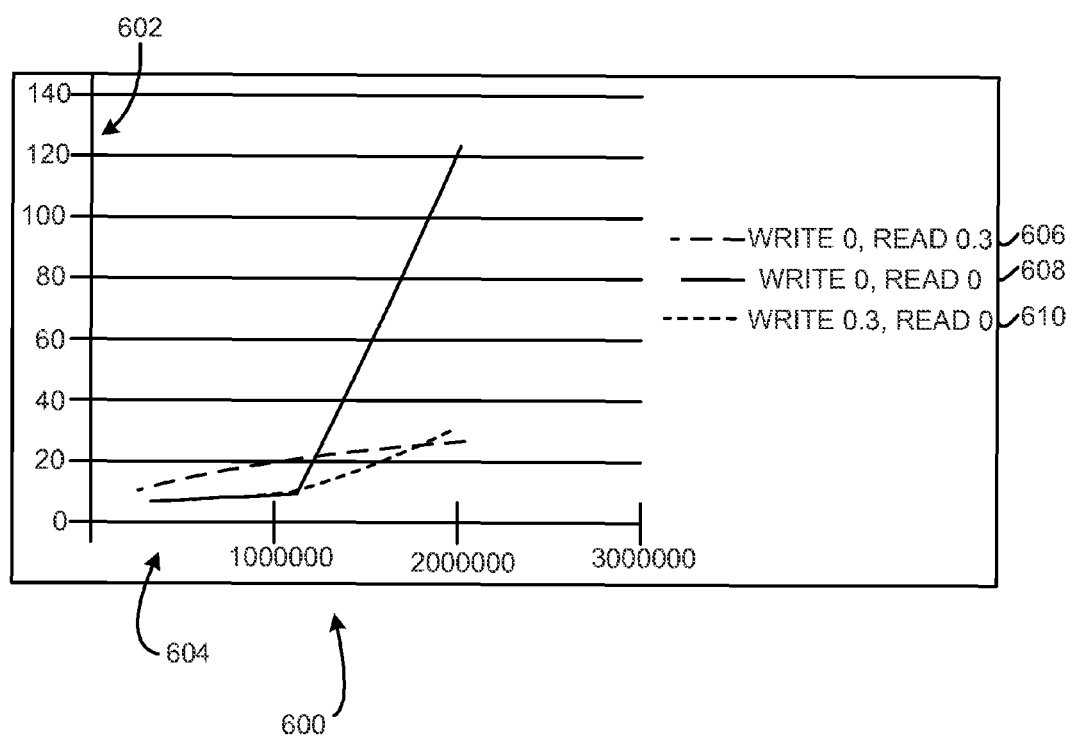
FIG. 6 is a graph illustrating results of a second example using the skip list of FIG. 2.

FIG. 6 is another graph 600 illustrating results of a second experiment of the adaptive probabilistic indexing where again time in seconds is along the y-axis 602 against I/O requests along the x-axis 604. The skip list is balanced with 5 million records. Two million random I/O requests were sent to the skip list, which included 80%, or 1.6 million reads and 20%, or 400,000 writes. In the first test 606, the read probability was 0.3 and the write probability was 0. In the second test 608, the read probability was 0 and the write probability was 0. In the third test 610, the read probability was 0 and the write probability was 0.3.

In the second test 608, a read probability and a write probability of zero meant no adjustments to increase level were made. In the first and third tests, maintenance of the skip list was performed either at the read or the write, whichever probability was not zero. The second test 608 performed poorly as expected. The performances of the first and third tests 606, 610 were similar to each other.

When pages are inserted at only the lowest level, the cost of balancing the skip list is postponed to future I/O requests from the current update I/O operation. But if the updates are at selected probabilities of the workload, the cost of balancing the skip list is spread across all I/O operations. In experiments, the selected probability was determined to be no more than 0.3.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A method, comprising:
    receiving information regarding read and write operations on a virtual memory configured to store data, wherein the virtual memory is allocated in a plurality of pages;
    inserting a node in a skip list having a plurality of levels, wherein the node corresponds with a page of the plurality of pages in the virtual memory ;
    creating a new node at a lowest level in the skip list during a write operation to a new page not represented in the skip list, wherein the new node corresponds with the new page, and wherein creating the new node includes incrementing the new node to a higher level of the skip list as determined by comparing a selected value with a preselected write probability; and
    reading from the new page during a read operation, wherein reading from the new page includes incrementing the corresponding node to a higher level of the skip list as determined by comparing a selected value with a preselected read probability, wherein the read probability is not equal to the write probability.

2. The method of claim 1 wherein the read probability and the write probability are selected based on distributions of read requests and write requests.

3. The method of claim 1 wherein one of the read probability and the write probability are selected from a set of values within the set of [0.2 . . . 0.5].

4. The method of claim 3 wherein the other of the read probability and the write probability equals zero.

5. The method of claim 1 wherein the write probability equals zero.

6. The method of claim 5 wherein no pointers at levels greater than the lowest level are updated from creating the new node.

7. The method of claim 6 wherein pointers of the new node and a previous node at the lowest level are updated from creating the new node.

8. The method of claim 5 wherein no pointers at the lowest level are updated from reading the page corresponding with the new node.

9. The method of claim 8 wherein pointers of the new node and a previous node are updated at a level greater than the lowest level when reading the page corresponding with the new node.

10. The method of claim 9 wherein pointer of the new node and a previous node are updated at levels greater than the lowest level when reading the page corresponding with the new node.

11. The method of claim 1 wherein the new node and a previous node pointing to the new node at the lowest level are locked to update pointers at the lowest level at write time, and wherein the new node and the previous node are locked to update pointers at higher levels than the lowest level at read time.

12. A computer readable storage medium storing instructions for controlling a processor to perform a method comprising:

receiving information regarding read and write operations on a virtual memory configured to store data, wherein the virtual memory is allocated in a plurality of pages;

inserting a node in a skip list having a plurality of levels, wherein the node corresponds with a page of the plurality of pages in the virtual memory;

creating a new node at a lowest level in the skip list during a write operation to a new page not represented in the skip list, wherein the new node corresponds with the new page, and wherein creating the new node includes incrementing the new node to a higher level of the skip list as determined by comparing a selected value with a preselected write probability; and reading the from new page during a read operation, wherein reading from the new page includes incrementing the corresponding node to a higher level of the skip list as determined by comparing a selected value with a preselected read probability, wherein the read probability is not equal to the write probability.

13. The computer readable medium of claim 12 wherein the skip list has a lowest level and a maximum level, and wherein incrementing the node to a higher level includes not incrementing the node after reaching the maximum level.

14. The computer readable medium of claim 12 wherein the new node and a previous node pointing to the new node at the lowest level are locked to update pointers at the lowest level at write time, and wherein the new node and the previous node are locked to update pointers at higher levels than the lowest level if the node is updated at read time.

15. The computer readable medium of claim 12 wherein the skip list is created as a data structure in a storage medium.

16. The computer readable medium of claim 12 wherein one of the read probability and the write probability is zero.

17. The computer readable medium of claim 16 wherein the read probability is zero and reading the node does not increment the node to a higher level.

18. A method, comprising:

receiving information regarding read and write operations on a virtual memory configured to store data, wherein the virtual memory is allocated in a plurality of pages;

populating a storage medium with a skip list having a plurality of nodes at each of a plurality of levels, wherein each node in a given level has a probability p of extending into the next highest level, wherein p is greater than zero and less than one, and wherein the each node of the plurality of nodes corresponds with a page in the virtual memory;

creating a new node at a lowest level in the skip list during a write operation to a page not represented in the skip list; wherein creating the new node includes incrementing the new node to a higher level of the skip list as determined by comparing a selected value with a preselected write probability; and reading from the new page during a read operation, wherein reading from the new page includes incrementing the corresponding node to a higher level of the skip list as determined by comparing a selected value with a preselected read probability, wherein the read probability is not equal to the write probability.

19. The method of claim 18 wherein the write probability is equal to zero.

20. The method of claim 18 wherein the probability p is selected from the set [0.2 . . . 0.5].

* * * * *